United States Patent [19]
Heffer

[11] 4,324,700
[45] Apr. 13, 1982

[54] PROCESS FOR PREPARING PLATINUM GROUP METAL CATALYSTS

[75] Inventor: John P. Heffer, Reading, England

[73] Assignee: Johnson Matthey Public Limited Company, London, England

[21] Appl. No.: 203,626

[22] Filed: Nov. 3, 1980

Related U.S. Application Data

[63] Continuation-in-part of Ser. No. 100,881, Dec. 6, 1979, abandoned.

[30] Foreign Application Priority Data

Dec. 8, 1978 [GB] United Kingdom ............... 47720/78

[51] Int. Cl.$^3$ ..................... B01J 23/42; B01J 23/44; B01J 23/46
[52] U.S. Cl. ............................... 252/472; 252/466 PT
[58] Field of Search ................ 252/439, 466 PT, 472; 423/213.5

[56] References Cited

U.S. PATENT DOCUMENTS 3,919,121 11/1975 Davies et al. ................. 252/466 PT
3,932,309  1/1976 Graham et al. ..................... 252/439
3,998,759 12/1976 Hoekstra ....................... 252/466 PT

*Primary Examiner*—W. J. Shine
*Attorney, Agent, or Firm*—Cushman, Darby & Cushman

[57] ABSTRACT

Process for preparing a catalyst which comprises precipitating a catalytic metal hydroxide or hydrated oxide from a solution of a water soluble salt of the metal; collecting the precipitate and redispersing it in water; passing sulphur dioxide gas through the dispersion to dissolve the solid hydroxide or hydrated oxide; contacting a solid support with the resulting solution; drying and firing the solid.

9 Claims, No Drawings

PROCESS FOR PREPARING PLATINUM GROUP METAL CATALYSTS

This application is a continuation-in-part of Serial No. 100,881, filed Dec. 6, 1979, now abandoned.

This invention relates to platinum group metal catalysts; more particularly it relates to such catalysts having high activity and to methods of preparing them.

It is well known that platinum group metals may be deposited upon solid particulate or monolithic supports to produce extremely effective catalysts for reactions occurring in a gas stream passing through or over the solid. Examples of reactions which can be so-catalyzed are oxidation, hydrogenation, reforming and reduction of oxides of nitrogen.

The activity of these catalysts depends to a large extent upon the degree of dispersion of the platinum group metal which can be obtained upon the solid support. The solid support is often washcoated with a high surface area refractory metal oxide, such as gamma alumina, which is then dried and calcined to produce a very large surface area for contact with the passing gas stream. Such techniques have proved extremely valuable. It has been found, however, that with increasingly stringent regulations governing the degree of atmospheric pollution which may take place the existing catalysts need to be made even more active in order to attain the performance required.

It is an object of the present invention to produce platinum, palladium and rhodium catalysts having highly dispersed crystallites deposited upon the surface of a supported refractory metal oxide and therefore to produce highly active platinum, palladium and rhodium catalysts or a combined platinum-rhodium or platinum-palladium catalyst. It is a further object of the present invention to provide a method whereby such catalysts may be manufactured cheaply, quickly and effectively with a minimum loss of catalytic metal. Rhodium and/or palladium and/or platinum are here and hereinafter collectively referred to as the "catalytic metal".

According to the present invention a process for the preparation of a catalyst containing catalytic metal comprises the following steps:

(a) precipitation of a hydroxide or hydrated oxide of the catalytic metal from a solution containing a water soluble salt of the catalytic metal, (b) collection of the precipitate from step (a) and redispersal to form a dispersion in a fresh quantity of water, (c) passage through the dispersion of step (b) of a sufficient quantity of sulphur dioxide gas to cause dissolution by sulphurous acid of substantially all the solid hydroxide or hydrated oxide, (d) contacting a solid support with the requisite volume of solution obtained from step (c) thus causing adsorption of a catalytic metal containing species to the external surfaces of the washcoat, and (e) drying and firing the solid obtained from step (d) thus producing an active catalyst.

Preferably, the support is washcoated as mentioned previously.

According to a second aspect of the present invention a process for the oxidation of hydrocarbon, partially oxidized hydrocarbon or carbon monoxide in a gas stream also containing air or oxygen or to which air or oxygen has been added comprises passing the said stream over or through a solid supported catalyst which has been prepared by a process according to the first aspect of the invention.

According to a third aspect of the present invention a process for the reduction of an oxide of nitrogen present in a gas stream together with a gaseous reducing fuel comprises passing the said stream over or through a solid supported catalyst which has been prepared by a process according to the first aspect of the invention.

The invention also includes a catalyst which has been made by a process according to the first aspect of the invention.

In the second and third aspects of the invention the gas stream is preferably at elevated temperature, preferably greater than 300° C.

Where platinum is the catalytic metal in step (a) of the first aspect of the invention, the water soluble salt of the catalytic metal is preferably sodium hexahydroxyplatinate and the hydroxide of the catalytic metal is preferably hexahydroxy platinic acid $H_2Pt(OH)_6$. Where rhodium is the catalytic metal the water soluble salt of rhodium is preferably sodium hexachlororhodate $Na_3RhCl_6$ and the hydroxide is preferably hydrated rhodium (III) hydroxide "$Rh(OH)_3xH_2O$". Where palladium is the catalytic metal the water soluble salt of palladium is preferably palladium chloride $PdCl_2$ which is soluble in alkali metal chloride solution, e.g. sodium chloride, to form alkali metal chloropalladiate, e.g. sodium chloropalladite $Na_2PdCl_4$. The hydroxide is preferably hydrated palladium hydroxide $pd(OH)_2xH_2O$.

The process of the invention may be performed with one or more of the catalytic metals stated thus producing an impregnating solution containing one, two or three metals at step (c). Separate precipitates may be prepared, collected at step (b), mixed in an appropriate weight ratio and the combined solid redispersed and dissolved in sulphurous acid at step (c). Rh-Pt or Pd-Pt combinations are preferred. In Example 3 Rh and Pt are co-impregnated. In Examples 1 and 2, however, rhodium and platinum catalysts are prepared separately. Palladium catalysts are prepared analogously.

Examples of suitable percentage weight ratios of platinum and/or palladium and/or rhodium in catalysts according to the invention are set out in the following table:

|    | Rh      | Pt       | Pd       |
|----|---------|----------|----------|
| A. | 1 to 20 | Balance  | nil      |
| B. | Nil     | Balance  | 1 to 50  |
| C. | 1 to 50 | Nil      | Balance. |
| D. | 1 to 20 | 20 to 98 | 1 to 60  |

EXAMPLE 1

Preparation of a catalyst where platinum is the catalytic metal. 150 g hexachloroplatinic acid were dissolved in 1500 ml water. 200 g sodium hydroxide pellets were dissolved in 500 ml water and this was slowly added with stirring to the chloroplatinic acid solution. The mixture was boiled with stirring for 2 hours. After cooling 200 ml glacial acetic acid was added (to give pH5) with stirring. After allowing to settle overnight a yield of approximately 80% hexahydroxyplatinic acid $H_2Pt(OH)_6$ is obtained. The supernatant liquor is decanted and the precipitate is vacuum or gravity washed with water until chloride-free.

The filter cake is redispersed in 600 ml water, warmed to 50° C. and SO₂ gas bubbled through the suspension until all H₂Pt(OH)₆ has dissolved. A pale amber color indicates that all platinum has been sulphited. Excess SO₂ is then boiled off and the solution rediluted to 600 ml. The diluted solution was used at room temperature to impregnate an alumina-washcoated ceramic monolith. Upon drying and firing at 450° C. a high activity-fine crystalline dispersion was formed on the external surfaces of the washcoat.

EXAMPLE 2

50 g sodium hexachlororhodite Na₃RhCl₆ were dissolved in 100 ml water. 10% aqueous solution sodium hydroxide was added with efficient stirring to give pH 10.2. The stirring was continued until pale yellow rhodium hydroxide Rh(OH)₃ had fully precipitated (yield approximately 100%). The precipitate was allowed to settle and a colorless mother liquor was decanted. The precipitate was washed with water and vacuum or gravity filtered and further washed until chloride free.

The filter cake was then redispersed in 450 ml water and sulphur dioxide gas was bubbled into the suspension with stirring until all the hydroxide had dissolved. A reddish brown colored solution resulted. Excess SO₂ was boiled off and the solution rediluted to 450 ml. Solutions in closed containers at the strength of 2% by weight Rh have been found to be stable for many months. Solutions greater than 10% w/w Rh tend to deposit, however. A so-prepared diluted solution was used at room temperature to impregnate an alumina-washcoated metallic monolith. Upon drying and firing at 450° C. a high activity-fine crystallite dispersion was formed on the external surfaces of the washcoat.

EXAMPLE 3

In operation of the process of the invention Pt and Rh solutions in sulphurous acid were mixed in a weight ratio of 11:1 Pt:Rh and the resulting solution used to impregnate a 300 cell per square inch Corning ceramic honeycomb washcoated with 1.75 g per cubic inch Al₂O₃ plus 4% by weight CeO₂. The precious metal loading was 40 g per cubic foot. The performance of this structure as a "three-way" catalyst for use in automobile exhaust purification was compared with a conventionally impregnated monolith using an 11:1 Pt:Rh impregnating solution which was a mixture of rhodium trichloride and chloroplatinic acid. The following readings were obtained for the lamda values given after running for 190 hours.

| Catalyst | Hours under test | $\lambda = 0.986$ HC CO NOX % Conversion | $\lambda = 0.995$ HC CO NOX % Conversion | CO/NOX Crossover HC CO NOX % Conversion | Lamda |
| --- | --- | --- | --- | --- | --- |
| Invention | 190 | 88 72 82 | 87 72 77 | 87.6 73.5 74.3 | 0.998 |
| Conventional | 190 | 83 56 80 | 83 61 72 | 84.2 66.0 66.5 | 1.001 |

In every case it can be seen that conversion of pollutant figures are higher for the catalyst prepared according to the invention.

I claim:

1. A process for the preparation of a catalyst containing a catalytic metal comprising the steps of:
    (a) precipitation of a hydroxide or hydrated oxide of the catalytic metal from a solution containing a water soluble salt of the catalytic metal,
    (b) collection of the precipitate from step (a) and redispersal to form a dispersion in a fresh quantity of water,
    (c) passage through the dispersion of step (b) of a sufficient quantity of sulphur dioxide gas to cause dissolution by sulphurous acid of substantially all the solid hydroxide or hydrated oxide,
    (d) contacting a solid support, to which a washcoat of a high surface area refractory metal oxide has previously been applied, with the requisite volume of solution obtained from step (c) thus causing adsorption of a catalytic metal containing species to the external surface of the said solid support, and
    (e) drying and firing the solid obtained from step (d) thus producing an active catalyst.

2. A process according to claim 1 wherein the catalytic metal is platinum.

3. A process according to claim 2 wherein the water soluble salt of platinum used in step (a) is sodium hexahydroxyplatinate and wherein the hydroxide of step (c) is hexahydroxy platinic acid.

4. A process according to claim 1 wherein the catalytic metal is rhodium.

5. A process according to claim 4 wherein the water soluble salt of rhodium used in step (a) is sodium hexachlororhodate and wherein the hydroxide of step (c) is hydrated rhodium (III) hydroxide.

6. A process according to claim 1 wherein the catalytic metal is palladium.

7. A process according to claim 6 wherein the water soluble salt of palladium is palladium chloride and the hydroxide of step (c) is hydrated palladium hydroxide.

8. A process according to claim 1 wherein the catalytic metal includes at least two of the platinum group metals.

9. A process according to claim 8 wherein the platinum group metals are platinum, rhodium and palladium.

* * * * *